(12) United States Patent
Araujo et al.

(10) Patent No.: US 9,062,913 B2
(45) Date of Patent: Jun. 23, 2015

(54) COOLING FABRICS

(71) Applicant: Columbia Sportswear North America, Inc., Portland, OR (US)

(72) Inventors: Christopher Araujo, Portland, OR (US); Michael E. Blackford, Portland, OR (US)

(73) Assignee: Columbia Sportswear North America, Inc., Portland, OR (US)

( * ) Notice: Subject to any disclaimer, the term of this patent is extended or adjusted under 35 U.S.C. 154(b) by 0 days.

(21) Appl. No.: 13/689,449

(22) Filed: Nov. 29, 2012

(65) Prior Publication Data

US 2013/0133353 A1    May 30, 2013

Related U.S. Application Data

(60) Provisional application No. 61/564,726, filed on Nov. 29, 2011.

(51) Int. Cl.
*F25D 23/12* (2006.01)
*F25D 15/00* (2006.01)
*A62D 5/00* (2006.01)
*F25D 31/00* (2006.01)
*B29C 69/00* (2006.01)
*A41D 13/005* (2006.01)

(52) U.S. Cl.
CPC ............... *F25D 31/00* (2013.01); *B29C 69/00* (2013.01); *A41D 13/0055* (2013.01)

(58) Field of Classification Search
CPC .................................................. A41D 31/0038
USPC ...................... 62/259.3, 331; 2/458
See application file for complete search history.

(56) References Cited

U.S. PATENT DOCUMENTS

| | | | | |
|---|---|---|---|---|
| 3,049,896 A | * | 8/1962 | Webb | 128/201.25 |
| 3,577,305 A | * | 5/1971 | Hines et al. | 428/72 |
| 4,420,521 A | * | 12/1983 | Carr | 428/74 |
| 4,525,406 A | * | 6/1985 | Pollock | 428/137 |
| 6,185,742 B1 | | 2/2001 | Doherty | |

(Continued)

FOREIGN PATENT DOCUMENTS

| | | |
|---|---|---|
| JP | 10-502137 A | 2/1998 |
| JP | 2005-343093 A | 12/2005 |

(Continued)

*Primary Examiner* — Allen Flanigan
*Assistant Examiner* — Filip Zec
(74) *Attorney, Agent, or Firm* — Schwabe, Williamson & Wyatt, P.C.

(57) ABSTRACT

Embodiments of the present disclosure relate generally to cooling fabrics having an array of cooling elements coupled to a base fabric, and in particular to methods and fabrics that utilize an array of cooling elements coupled to a base material to absorb heat while also maintaining desired properties of the base material. In some embodiments, the cooling elements may include a cooling gel or polymer or a phase change material, and the cooling elements may undergo a chemical or physical change when exposed to moisture, thereby absorbing heat.

22 Claims, 6 Drawing Sheets

(56) References Cited

U.S. PATENT DOCUMENTS

| | | | |
|---|---|---|---|
| 6,269,654 B1 * | 8/2001 | Murray et al. | 62/530 |
| 6,698,510 B2 * | 3/2004 | Serra et al. | 165/185 |
| 6,802,081 B1 | 10/2004 | Ogino et al. | |
| 7,028,344 B2 * | 4/2006 | Toth | 2/413 |
| 7,465,490 B2 * | 12/2008 | Von Blucher | 428/316.6 |
| 8,048,371 B1 * | 11/2011 | Kapur et al. | 422/50 |
| 8,424,119 B2 * | 4/2013 | Blackford | 2/456 |
| 2010/0282433 A1 * | 11/2010 | Blackford | 165/46 |
| 2012/0015155 A1 * | 1/2012 | Blackford et al. | 428/189 |

FOREIGN PATENT DOCUMENTS

| | | |
|---|---|---|
| JP | 2008-057100 A | 3/2008 |
| JP | 2009-185420 | 8/2009 |
| RU | EA005018 B1 | 10/2004 |
| TW | M346608 | 8/1997 |
| TW | M393308 | 12/2010 |
| WO | 02/059414 | 8/2002 |
| WO | 2006-014338 | 2/2006 |
| WO | 2010-129923 | 11/2010 |

\* cited by examiner

COOLING FABRICS

CROSS-REFERENCE TO RELATED APPLICATION

The present application claims priority to U.S. Provisional Patent Application No. 61/564,726, filed Nov. 29, 2011, titled "COOLING FABRICS," the entire specification of which is hereby incorporated by reference in its entirety for all purposes, except those sections, if any, that are inconsistent with this specification.

TECHNICAL FIELD

Embodiments of the present disclosure relate generally to fabrics used for apparel and other goods having designed performance characteristics, and in particular to fabrics that utilize a pattern of cooling elements coupled to a base fabric to enhance cooling and/or wicking.

BACKGROUND

Fabric performance characteristic materials such as wicking materials and the like typically take the form of uniform layers that are woven into or otherwise incorporated into the interior of a garment. The purpose of these materials may be to enhance wicking and thereby cool the body. However, many fabrics branded as having "cooling" properties do not perform a cooling function, and only serve to enhance breathability. Cooling fabrics that do incorporate a layer of cooling materials, such as cooling gels and phase change materials, also have shortcomings, particularly when incorporated as a continuous layer. For example, a uniform layer of cooling material may not transfer moisture vapor or allow air passage. Furthermore, such cooling materials may not have the desired characteristics of the base fabric, such as drape, stretch, and the like. Thus, the use of a layer of cooling material may impede the breathability (or another function) of the underlying base fabric.

BRIEF DESCRIPTION OF THE DRAWINGS

Embodiments of the present disclosure will be readily understood by the following detailed description in conjunction with the accompanying drawings. Embodiments are illustrated by way of example and not by way of limitation in the figures of the accompanying drawings.

DETAILED DESCRIPTION OF EMBODIMENTS

Figure 1A:
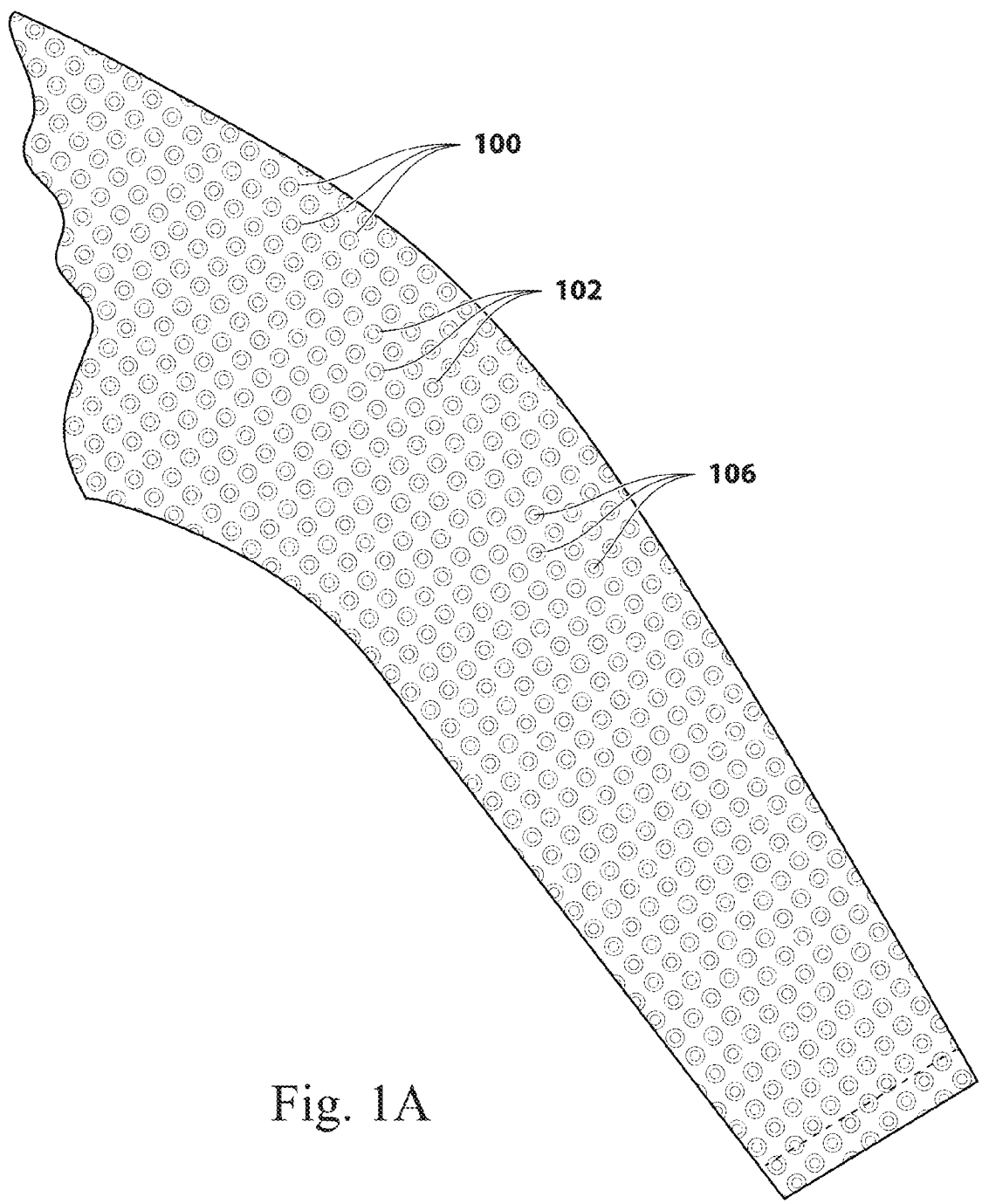
FIG. 1A is a perspective view of an example of a portion of a garment made with a cooling fabric having a base fabric and cooling elements disposed thereon, in accordance with various embodiments.

In the following detailed description, reference is made to the accompanying drawings which form a part hereof, and in which are shown by way of illustration embodiments in which the disclosure may be practiced. It is to be understood that other embodiments may be utilized and structural or logical changes may be made without departing from the scope of the present disclosure. Therefore, the following detailed description is not to be taken in a limiting sense, and the scopes of embodiments, in accordance with the present disclosure, are defined by the appended claims and their equivalents.

Various operations may be described as multiple discrete operations in turn, in a manner that may be helpful in understanding embodiments of the present invention; however, the order of description should not be construed to imply that these operations are order dependent.

The description may use perspective-based descriptions such as up/down, back/front, and top/bottom. Such descriptions are merely used to facilitate the discussion and are not intended to restrict the application of embodiments of the present invention.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

In various embodiments, fabrics for clothing and other body gear are disclosed that may use a pattern of cooling elements coupled to or integrated with a base fabric to manage moisture and body heat by absorbing heat and enhancing wicking when exposed to moisture, while still maintaining the desired properties of the base fabric. In various embodiments, the cooling elements may include cooling gels or polymers and/or phase change materials. In some embodiments, the cooling elements may undergo a chemical and/or physical change when exposed to moisture, and/or may absorb energy, thus cooling the skin of the wearer. In some embodiments, the chemical and/or physical change also may entail a conformational change, which may stretch portions of the base fabric, thus enlarging fabric pores and increasing breathability and/or wicking of the base fabric.

FIG. 1A is a perspective view of an example of a portion of a garment made with a cooling fabric having a base fabric and cooling elements disposed thereon, in accordance with various embodiments. As illustrated in FIG. 1A, in various embodiments, a plurality of individual cooling elements 100 may be disposed on a base fabric 102 in a generally non-continuous array, whereby some of the base fabric 102 may be exposed between adjacent cooling elements. In various embodiments, such as the embodiment illustrated in FIG. 1A, the cooling elements may be arranged in an array of separate elements, whereas in other embodiments discussed at greater length below, the cooling elements may be arranged in an interconnected pattern. In some embodiments, such as the embodiment illustrated in FIG. 1A, each individual cooling element may take the form of a closed loop member, such as a closed circle, square, hexagon, or other closed shape that may include a center portion 106 wherein the base fabric is exposed.

As described below in greater detail, cooling elements 100 may include one or more cooling materials, such as a cooling gel or a phase change material. In various embodiments, cooling elements 100 may cover a sufficient surface area of the base fabric 102 to achieve the desired degree of cooling, for example, having a surface coverage area of cooling elements 100 of about 15-80%, about 25-70%, about 30-65%, or about 40-60% in various embodiments. This coverage range leaves about 20-85%, about 30-75%, about 35-65%, or about 40-60% of the base fabric 102 uncovered in various embodiments. Generally, a sufficient area of base fabric 102 should be exposed to provide the desired base fabric function (e.g., stretch, drape, breathability, moisture vapor transfer, air permeability, and/or wicking). For example, if there is too little exposed base fabric, properties such as moisture vapor transfer and/or permeability may suffer greatly, and even disproportionately to the percentage of coverage.

In accordance with various embodiments, the base fabric 102 may be a part of any form of clothing or bodywear, which term is used herein to include anything worn on the body, including, but not limited to, athletic wear such as compression garments, t-shirts, shorts, tights, sleeves, headbands and the like, outerwear such as jackets, pants, scarves, shirts, hats, gloves, mittens, and the like, footwear such as shoes, boots, slippers, and the like, sleepwear, such as pajamas, nightgowns, and robes, and undergarments such as underwear, thermal underwear, undershirts, brassieres, socks, hosiery, and the like.

In various embodiments, the array of cooling elements 100 may be disposed on a base fabric 102 having one or more desired properties. For example, the underlying base fabric 102 may have properties such as air permeability, absorbance, moisture vapor transfer, and/or wickability, which are common needs for bodywear used in both indoor and outdoor applications. In some embodiments, the underlying base fabric 102 may have other desirable attributes, such as abrasion resistance, anti-static properties, anti-microbial activity, water repellence, flame repellence, hydrophilicity, hydrophobicity, wind resistance, UV protection, resiliency, stain resistance, wrinkle resistance, and the like. In some embodiments, the areas of uncovered base fabric 102 between and/or inside cooling elements 100 may help allow the base fabric 102 to have a desired drape, look, stretch, and/or texture. Specific examples of suitable base fabrics 102 may include nylon, polyester, rayon, cotton, spandex, wool, silk, or a blend thereof, or any other material having a desired look, feel, weight, thickness, weave, texture, or other desired property.

In various embodiments, configuring the cooling fabric to allow a designated percentage of the base fabric 102 to remain uncovered by the cooling elements 100 may allow that portion of the base fabric 102 to perform the desired functions, while still leaving enough surface area of cooling elements 100 to cool the body to a desired degree. In various embodiments, single-layer bodywear may be used, and may be comprised of a single layer of the base fabric 102, whereas other embodiments may use multiple layers of fabric, including, for example, one or more additional layers of the base fabric or another fabric. For instance, the base fabric 102 may be used as a fabric lining for bodywear.

Figure 1B:
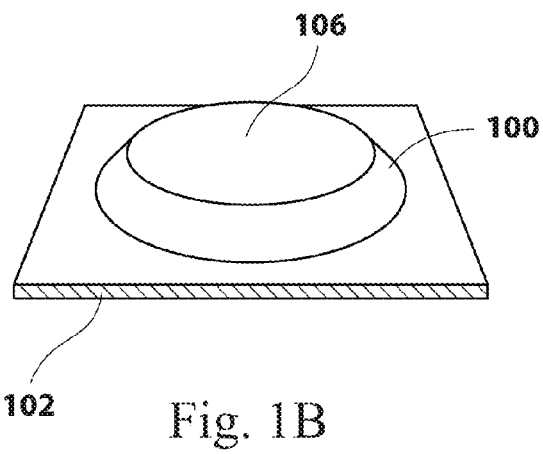
FIG. 1B is a perspective view of the underside of the cooling fabric illustrated in FIG. 1A, when the cooling elements are in a dry state, in accordance with various embodiments.
Figure 1C:
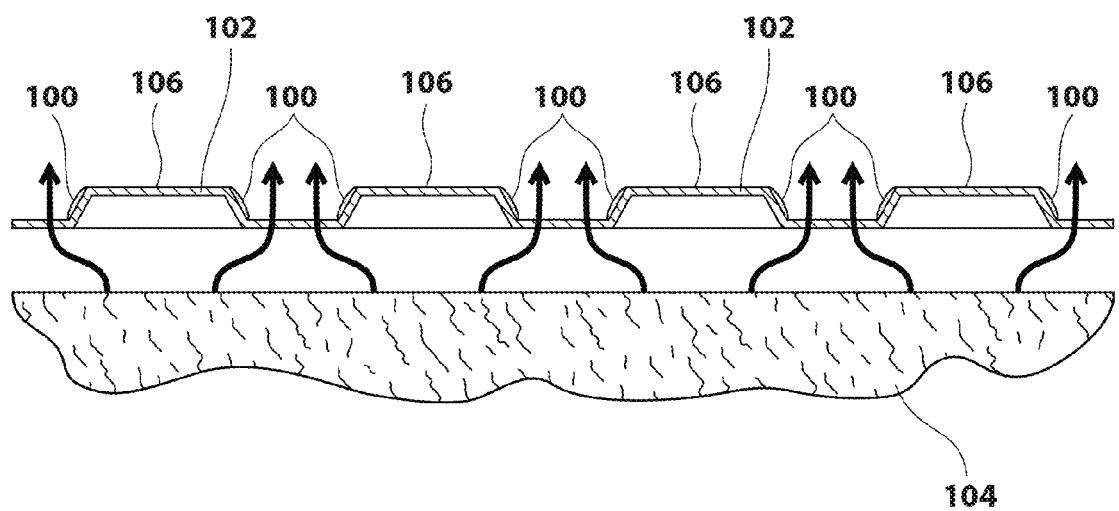
FIG. 1C is a cross sectional view of the cooling fabric illustrated in FIG. 1A when the cooling elements are in a dry state, in accordance with various embodiments.
Figure 1D:
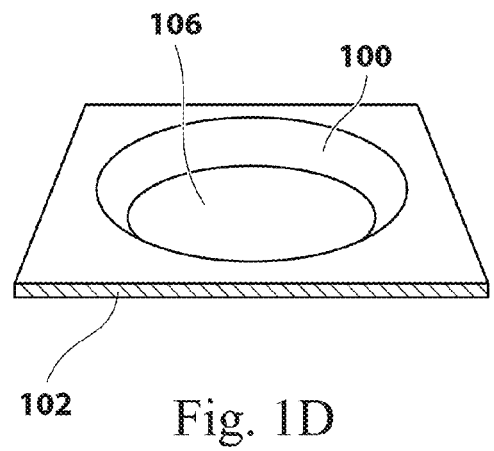
FIG. 1D is a perspective view of the underside of the cooling fabric illustrated in FIG. 1A when the cooling elements are in a wet state, in accordance with various embodiments.
Figure 1E:
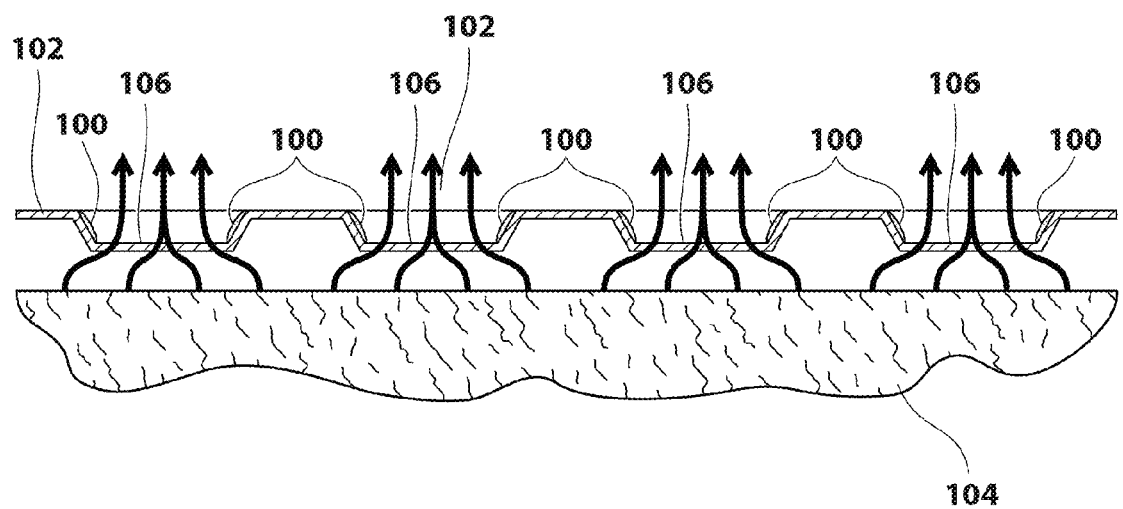
FIG. 1E is a cross sectional view of the cooling fabric illustrated in FIG. 1A when the cooling elements are in a wet state, in accordance with various embodiments.

Turning now to FIGS. 1B-1E, in various embodiments, cooling elements 100 may be positioned in such a way and may be made of a material that is conducive for absorbing heat generated by the body. In some embodiments, cooling elements 100 may undergo a physical or chemical change when exposed to moisture, such as water or sweat, and this physical or chemical change may result in the absorbance of heat, thus providing cooling to the body of the wearer. FIG. 1B shows a perspective view of the underside of the cooling fabric illustrated on FIG. 1A, and FIG. 1C shows a cross-sectional view of the cooling fabric illustrated in FIG. 1A when the cooling elements are in a dry state, in accordance with various embodiments. In the embodiment illustrated in FIGS. 1B and 1C, cooling elements 100 are disposed on a lower surface of the base fabric 102 (e.g., an inside surface of the body gear, facing the skin), placing the cooling elements 100 in a good position for absorbing body heat and sweat from the skin of a user. Although FIGS. 1B and 1C illustrate a cooling fabric in which cooling elements 100 are coupled to a lower or inside surface of base fabric 102, one of skill in the art will appreciate that cooling elements 100 instead may be coupled to an upper or outside surface of base fabric 102 in other embodiments, depending on the desired properties of the cooling fabric. In these embodiments, the wicking or moisture vapor transfer properties of the base fabric may allow moisture (such as water, water vapor, or sweat) from the body to reach the cooling elements 100 as the moisture passes through the base fabric. In still other embodiments, cooling elements 100 may be at least partially integrated into or may at least partially permeate base fabric 102.

In one specific, non-limiting embodiment, cooling elements 100 may be applied to a lower or inside surface of base fabric 102 in such a way as to cause cooling elements 100 to adopt a convex shape in relation to the skin surface 104, and that may generally cause cooling elements 100 to curve away from the body when in the dry state (see, e.g., FIGS. 1B and 1C). In the illustrated embodiment, when cooling elements 100 in the dry state (e.g., FIGS. 1B and 1C) are exposed to moisture, such as water, water vapor, or sweat, they may absorb moisture and undergo a chemical and/or physical change that may absorb heat from the body of the wearer and that also may result in a conformational change that causes the cooling elements 100 to adopt a concave shape (see, e.g., FIGS. 1D and 1E). Cooling elements 100 that have undergone this conformational change may be referred to as being in the "wet state," although one of skill in the art will appreciate that the cooling elements may not feel wet to a user. In various embodiments, a cooling element in the wet state may undergo another conformational change and revert to its "dry state" conformation as water evaporates from the cooling element. In various embodiments, this process may be repeated many times, such as 100, 1,000, 10,000, or even more times through the lifespan of the fabric.

As described above, in various embodiments, this chemical and/or physical change may involve an energy transformation that may cause cooling elements 100 to absorb heat, for example cooling the skin of the user. At the same time, the conformational change may cause portions of base fabric 102, for example portions of the base fabric in the center portion 106 of each cooling element 100, to be stretched, which may enlarge the pores of the weave of base fabric 102, thereby enhancing breathability and wickability of base fabric 102 in these regions.

Figure 2:
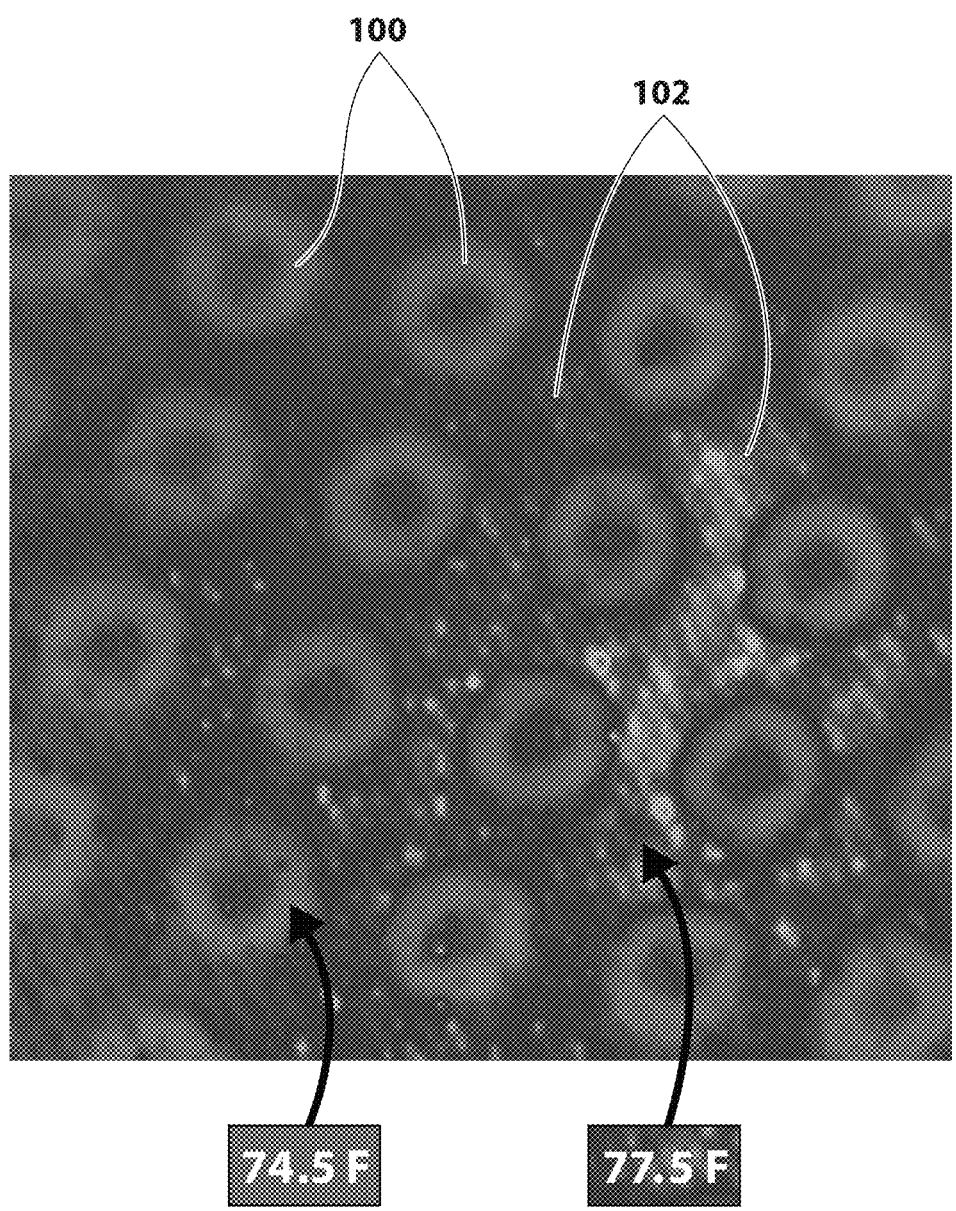
FIG. 2 is a thermal image of an example of a pattern of cooling elements on a base fabric, in accordance with various embodiments.
Figure 3A:
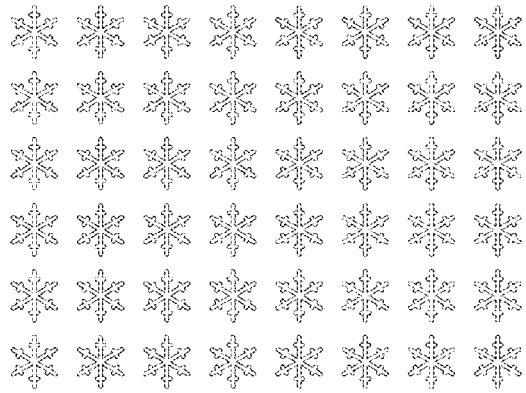
FIGS. 3A-3F illustrate a variety of specific, non-limiting examples of patterns of individual cooling elements for use in accordance with various embodiments.
Figure 3B:
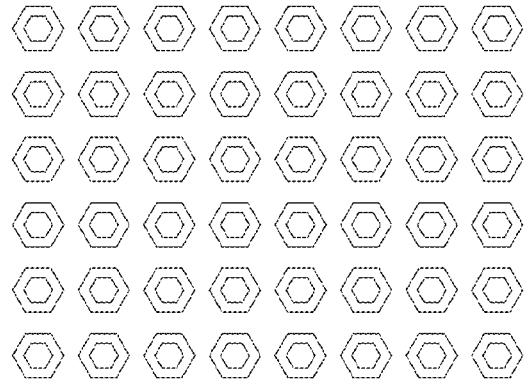
Figure 3C:
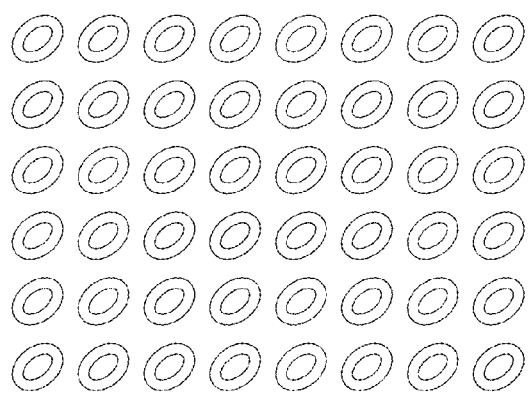
Figure 3D:
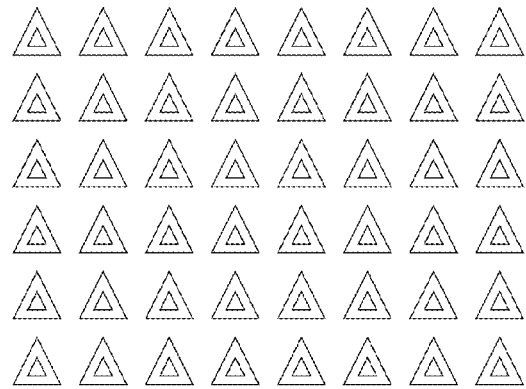
Figure 3E:
Figure 3F:
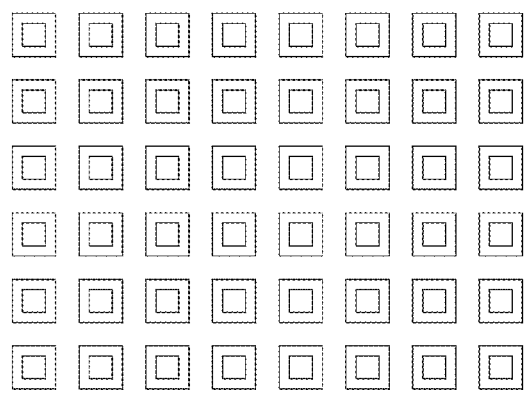
Figure 4A:
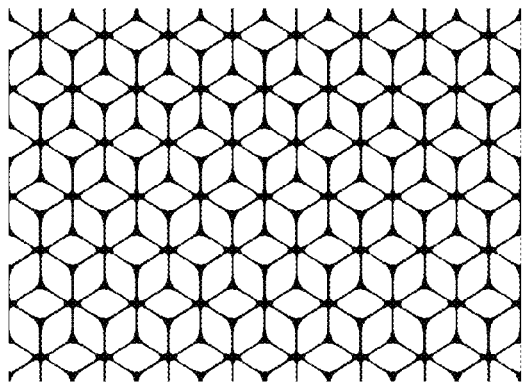
FIGS. 4A-4F illustrate a variety of specific, non-limiting examples of patterns of interconnected cooling elements for use in accordance with various embodiments.
Figure 4B:
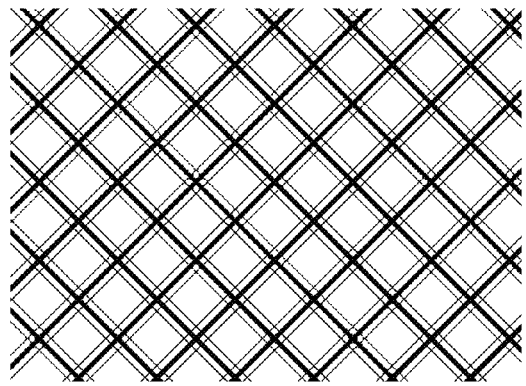
Figure 4C:
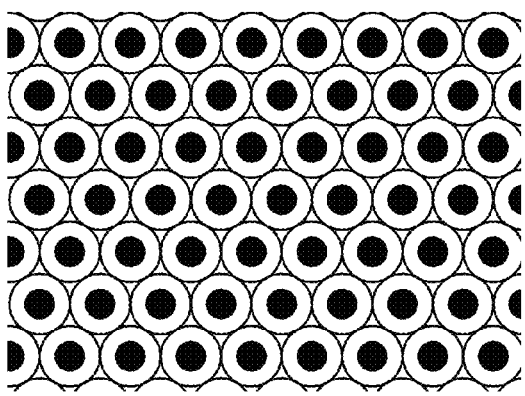
Figure 4D:
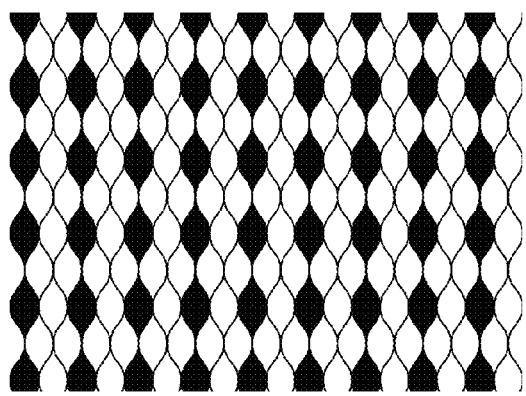
Figure 4E:
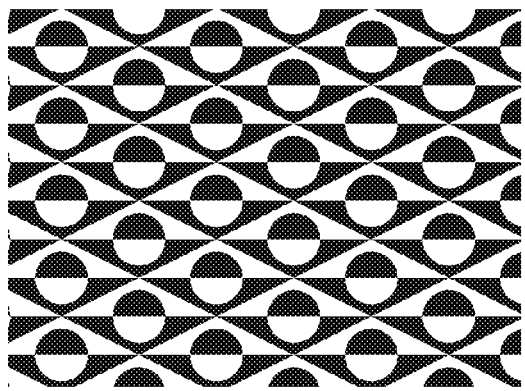
Figure 4F:
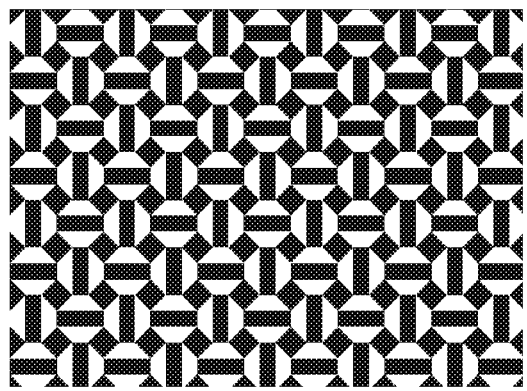

FIG. 2 is a thermal image of an example of a pattern of cooling elements on a base fabric, in accordance with various embodiments. As illustrated in FIG. 2, the cooling elements 100 may register as a cooler temperature than the base fabric 102 on a thermogram, for example when exposed to moisture. In various embodiments, cooling elements 100 may include a cooling gel and/or polymer, which may absorb heat when exposed to moisture. In various embodiments, cooling gels and/or polymers may include, for example, any suitable natural or synthetic polymeric material that, in a dry form, is capable of absorbing and storing many times its weight in water. Specific, non-limiting examples of natural gums that may be used as cooling polymers include xanthan, agar, pectin, locust bean gum, hydroxypropyl guar gum, polyglucomannan gum, cationic guar gum, anionic guar gum, alginate, irish moss, and gum arabic. Specific, non-limiting examples of cellulosics that may be used as cooling polymers include methyl cellulose, ethyl cellulose, carboxymethyl cellulose, carboxy ethyl cellulose, hydroxyethyl cellulose, hydroxymethyl cellulose, and hydroxypropylcellulose.

Specific, non-limiting examples of synthetic hydrogel polymers that may be used as cooling gels include suitable crosslinked, water-swellable acrylic copolymers. In particular embodiments, the synthetic hydrogel polymers may include, without limitation, copolymers that include repeat units from one or more monomers selected from (meth) acrylic acid, maleic acid, 2-(meth)acrylamido-2-methyl propane sulfonic acid, styrene sulfonate, vinyl sulfonic acid, and their corresponding ammonia, amine and alkali metal salts, (meth)acrylamide, vinyl alcohol, vinyl acetate, maleic anhydride, alkyl vinyl ethers, vinylmorpholinone, vinylpyrridine, vinyl pyrrolidone, and acrylonitrile; and one or more crosslinking agents selected from N,N'-methylenebis(meth) acrylamide, (poly)ethylene glycol di(meth)acrylate, (poly) propylene glycol di(meth)acrylate, trimethylolpropane tri (meth)acrylate, glycerol tri(meth)acrylate, glycerol acrylate methacrylate, ethylene-oxide-modified trimethylolpropane tri(meth)acrylate, pentaerythritol tetra(meth)acrylate, dipentaerythritol hexa(meth)acrylate, triallyl cyanurate, triallyl isocyanurate, triallyl phosphate, triallylamine, poly(meth)allyloxyalkanes, (poly)ethylene glycol diglycidyl ether, glycerol diglycidyl ether, ethylene glycol, polyethylene glycol, propylene glycol, glycerol, pentaerythritol, ethylenediamine, ethylene carbonate, propylene carbonate, polyethylenimine, glycidyl (meth)acrylate, diallyl sucrose, triallyl sucrose triallyl amine, and triallyl methyl ammonium chloride. Other specific examples of cooling polymers may include paraffin ($C_nH_{2n}^{2+}$), fatty acids ($CH_3(CH_2)_{2n}COOH$), salt hydrates ($M_nH_2O$), hygroscopic materials, trimethylolethane, and lauric acid. In particular embodiments, the cooling gel may include polyacrylate and/or sodium polyacrylate mixed or cross-linked with a non-soluble compound, such as polyurethane.

Other specific, non-limiting examples include styrenic block copolymers, which are thermoplastic elastomers that may include at least three blocks, for instance two hard polystyrene end blocks and one soft, elastomeric (e.g., polybutadiene, polyisoprene, or their hydrogenated equivalents) midblock. In various embodiments, the hard and soft blocks may be immiscible, so that, on a microscopic scale, the polystyrene blocks form separate domains in the rubber matrix, thereby providing physical cross links to the rubber.

Additional cooling polymers and methods to manufacture such polymers are described, without limitation, in U.S. Pat. Nos. 6,469,080, 6,399,668, 6,127,454, 6,087,002, 5,244,735, 4,925,603, and 4,734,478. Additional non-limiting examples of cooling polymers that may be used in performance characteristic elements include those available under the trade names ALCOSORB® from Ciba Specialty Chemicals, Chatanooga, Term.; DRYTECH® from the Dow Chemical Company, Midland, Mich.; NORSOCRYL® and AQUAKEEP® from Atofina, Paris, France; HYDROSORB™ from HYDROSORB Inc., Orange, Calif.; and AQUALIC CA from Nippon, Shokubai Co., Ltd., Osaka, Japan.

In other embodiments, the cooling elements may include a phase change material. Generally speaking, phase change materials may have the capability of absorbing or releasing thermal energy to reduce or eliminate heat transfer at the temperature stabilizing range of the particular phase change material. In various embodiments, the phase change material may inhibit or stop the flow of thermal energy during the time the phase change material is absorbing or releasing heat, typically during the material's change of phase. In various embodiments, this action may be transient, e.g., it may be effective as a barrier to thermal energy until the total latent heat of the temperature stabilizing material is absorbed or released during the heating or cooling process. In various embodiments, thermal energy may be stored or removed from the phase change material, and may be effectively recharged by a source of heat or cold. In various embodiments, by selecting an appropriate phase change material, a performance characteristic element may be created for use in a particular application where the stabilization of temperatures is desired. In various embodiments, two or more different phase change materials may be used to address particular temperature ranges, and such materials may be mixed.

In various embodiments, phase change materials that may be used as described herein generally include paraffinic hydrocarbons having 13 to 28 carbon atoms. In various embodiments, the melting point of a homologous series of paraffin hydrocarbons may be directly related to the number of carbon atoms as shown in the following table:

| Compound Name | Number of Carbon Atoms | Melting Point (° C.) |
| --- | --- | --- |
| n-Octacosane | 28 | 61.4 |
| n-Heptacosane | 27 | 59.0 |
| n-Hexacosane | 26 | 56.4 |
| n-Pentacosane | 25 | 53.7 |
| n-Tetracosane | 24 | 50.9 |
| n-Tricosane | 23 | 47.6 |
| n-Docosane | 22 | 44.4 |
| n-Heneicosane | 21 | 40.5 |
| n-Eicosane | 20 | 36.8 |
| n-Nonadecane | 19 | 32.1 |
| n-Octadecane | 18 | 28.2 |
| n-Heptadecane | 17 | 22.0 |
| n-Hexadecane | 16 | 18.2 |
| n-Pentadecane | 15 | 10.0 |
| n-Tetradecane | 14 | 5.9 |
| n-Tridecane | 13 | −5.5 |

In various embodiments, the cooling elements 100 may be permanently coupled to the base fabric 102 in a variety of ways, including, but not limited to gluing, heat pressing, printing, or stitching. In some embodiments, the cooling elements may be coupled to the base fabric by frequency welding, such as by radio or ultrasonic welding. In some embodiments, the cooling elements may be coupled to the base fabric using gravure coating. In some specific, non-limiting examples, the gravure coating process may use an engraved roller running in a coating bath, which fills the engraved dots or lines of the roller with the coating material (e.g., the gel making up the cooling elements). The excess coating on the roller may be wiped off using a blade, and the coating may then be deposited onto the substrate (e.g., the base fabric) as it passes between the engraved roller and a pressure roller. In various embodiments, the gravure coating process may include direct gravure, reverse gravure, or differential offset gravure, and in various embodiments, the coat weight may be controlled by the percent of solids, the gravure volume, the pattern depth, and/or the speed of the gravure cylinder.

In various embodiments, the heat management material elements may be applied in a pattern or a continuous or discontinuous array. For example, as illustrated in FIGS. 3A-3F, the cooling elements may take the form of an array of closed loop members, such as rings, adhered or otherwise secured to the base fabric in a desired pattern. Such a configuration has been found to provide cooling to the user while still allowing the base fabric to perform desired properties (e.g., breathe and allow moisture vapor to escape through the fabric in order to reduce the level of moisture build up). In various embodiments, such discontinuous, discrete, separate cooling elements may take the form of circles, triangles, squares, pentagons, hexagons, octagons, stars, crosses, crescents, ovals, or any other substantially closed loop member that includes a center portion inside the closed loop member wherein the base fabric remains exposed.

Although the embodiments illustrated in FIGS. 3A-3F show the cooling elements as separate, discrete elements, in some alternate embodiments, some or all of cooling elements may be arranged such that they are in connection with one another, such as a lattice pattern or any other pattern that permits partial coverage of the base fabric. For example, as illustrated in FIGS. 4A-4F, the configuration of cooling elements disposed on a base fabric may be in the form of a variety of partially or completely, and the pattern may combine both discontinuous elements (such as those illustrated in FIGS. 3A-3F) and interconnected geometrical patterns (such as those illustrated in FIGS. 4A-4F). In various embodiments, the pattern of cooling elements may be symmetrical, ordered, random, and/or asymmetrical. Further, as discussed below, the pattern of cooling elements may be disposed on the base fabric at strategic locations to improve the performance of the bodywear. In various embodiments, the size and/or spacing of the cooling elements may also be varied in different areas of the bodywear to balance the need for enhanced cooling properties and preserve the functionality of the base fabric.

In some embodiments, the percentage of base fabric surface area covered by the cooling elements to the surface are of base fabric left uncovered by the cooling elements may be from about 25% to about 67%. This range has been shown to provide a good balance of cooling properties with the desired properties of the base fabric (e.g., breathability or wicking, for instance). In particular embodiments, this percentage of surface area coverage may be about 30% to about 65%, or about 40% to about 60%.

In various embodiments, the placement, pattern, and/or coverage ratio of the cooling elements may vary. For example the cooling elements may be concentrated in certain areas where cooling may be more critical (e.g., the body core) and non existent or extremely limited in other areas where the function of the base fabric property is more critical. In various embodiments, different areas of the bodywear may have different coverage ratios, e.g. 67% at the chest and 30% at the limbs, in order to help optimize, for example, the need for cooling and breathability.

In various embodiments, the size of the cooling elements may be largest (or the spacing between them may be the smallest) in the core regions of the body for enhanced cooling in those areas, and the size of the cooling elements may be the smallest (or the spacing between them may be the largest) in peripheral areas of the body. In some embodiments, the degree of coverage by the cooling elements may vary in a gradual fashion over the entire garment as needed for regional cooling.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope of the present disclosure. Those with skill in the art will readily appreciate that embodiments in accordance with the present disclosure may be implemented in a very wide variety of ways. This application is intended to cover any adaptations or variations of the embodiments discussed herein. Therefore, it is manifestly intended that embodiments in accordance with the present disclosure be limited only by the claims and the equivalents thereof.

We claim the following:

1. A cooling fabric adapted for use with bodywear, comprising:
   a base material having a transfer property that is adapted to allow passage of a natural element through the base material, the base material having an outer surface and a body-facing surface; and
   a discontinuous array of discrete cooling elements each directly coupled to the body-facing surface of the base material, the cooling elements being adapted to absorb heat when exposed to moisture, wherein each cooling element comprises a closed loop member, wherein the placement and spacing of the cooling elements enables the base material to retain partial performance of the transfer property, and wherein the cooling elements comprise a cooling polymer, a phase change material, or a combination thereof.

2. The cooling fabric of claim 1, wherein the natural element is air, moisture, water vapor, or heat.

3. The cooling fabric of claim 1, wherein the base material comprises a moisture-wicking fabric.

4. The cooling fabric of claim 1, wherein the cooling elements have a maximum spacing of less than about 1 cm.

5. The cooling fabric of claim 1, wherein the cooling elements have a minimum spacing of more than about 1 mm.

6. The cooling fabric of claim 1, wherein the cooling elements comprise closed loop members.

7. The cooling fabric of claim 1, wherein the cooling elements are each directly coupled to the body-facing surface of the base material by gluing, heat pressing, printing, stitching, frequency welding, or by gravure coating.

8. A cooling fabric adapted for use with bodywear, comprising:
   a base material having a transfer property that is adapted to allow passage of a natural element through the base material; and
   a discontinuous array of discrete cooling elements each directly coupled to a first side of the base material, the cooling elements being adapted to absorb heat when exposed to moisture, wherein each cooling element comprises a closed loop member, wherein the placement and spacing of the cooling elements enables the base material to retain partial performance of the transfer property, wherein the cooling elements are configured to undergo a conformational change when exposed to moisture, and wherein the conformational change enhances the transfer property of the base material.

9. The cooling fabric of claim 8, wherein the conformational change enhances moisture vapor transfer across the base material.

10. The cooling fabric of claim 8, wherein the conformational change comprises a change from a convex profile to a concave profile with respect to a skin surface.

11. The cooling fabric of claim 8, wherein the cooling elements comprise closed loop members, and wherein the conformational change causes a region of the base material within each closed loop member to stretch.

12. The cooling fabric of claim 11, wherein the base material comprises pores and the stretched base material comprises enlarged pores.

13. The cooling fabric of claim 12, wherein the enlarged pores facilitate transfer of the natural element.

14. The cooling fabric of claim 8, wherein the cooling elements are each directly coupled to the body-facing surface of the base material by gluing, heat pressing, printing, stitching, frequency welding, or by gravure coating.

15. A cooling fabric adapted for use with bodywear, comprising:
a base material having a transfer property that is adapted to allow passage of a natural element through the base material, the base material having an outside surface and a body-facing surface; and
a discontinuous array of discrete cooling elements each directly coupled to the body-facing surface of the base material, the cooling elements being adapted to absorb heat when exposed to moisture, wherein each cooling element comprises a closed loop member, wherein the placement and spacing of the cooling elements enables the base material to retain partial performance of the transfer property, wherein a percentage of surface area coverage of the cooling elements is from about 25% to about 67%.

16. The cooling fabric of claim 15, wherein a percentage of surface area coverage of the cooling elements is from about 40% to about 60%.

17. The cooling fabric of claim 15, wherein the cooling elements are each directly coupled to the body-facing surface of the base material by gluing, heat pressing, printing, stitching, frequency welding, or by gravure coating.

18. A method of making a cooling fabric, comprising:
selecting a base material having a transfer function that is adapted to allow passage of a natural element through the base material, the base material having an outer surface and a body-facing surface; and
directly coupling a discontinuous array of discrete cooling elements to the body-facing surface of the base material, the cooling elements being adapted to absorb heat when exposed to moisture, wherein each cooling element comprises a closed loop member, wherein the placement and spacing of the cooling elements enables the base material to retain partial performance of the transfer function, wherein the cooling elements are configured to undergo a conformational change when exposed to moisture, and wherein the cooling elements comprise a cooling polymer, a phase change material, or a combination thereof.

19. The cooling fabric of claim 18, wherein directly coupling the discontinuous array of discrete cooling elements to the body-facing surface of the base material comprises gluing, heat pressing, printing, stitching, frequency welding, or gravure coating the discontinuous array of discrete cooling elements to the body-facing surface of the base material.

20. A method of making a cooling fabric, comprising:
selecting a base material having a transfer function that is adapted to allow passage of a natural element through the base material, the base material having an outer surface and a body-facing surface; and
directly coupling a discontinuous array of discrete cooling elements to the body-facing surface of the base material, the cooling elements being adapted to absorb heat when exposed to moisture, wherein each cooling element comprises a closed loop member, wherein the placement and spacing of the cooling elements enables the base material to retain partial performance of the transfer function, wherein the cooling elements are configured to undergo a conformational change when exposed to moisture, and wherein the conformational change enhances the transfer function of the base material.

21. The method of claim 20, wherein the conformational change causes a region of the base material within each closed loop member to stretch.

22. The cooling fabric of claim 20, wherein directly coupling the discontinuous array of discrete cooling elements to the body-facing surface of the base material comprises gluing, heat pressing, printing, stitching, frequency welding, or gravure coating the discontinuous array of discrete cooling elements to the body-facing surface of the base material.

* * * * *